(12) United States Patent
Perkins

(10) Patent No.: US 11,592,374 B2
(45) Date of Patent: Feb. 28, 2023

(54) CRYOSTAT CHUCK

(71) Applicant: Shane Perkins, Dunbarton, NH (US)

(72) Inventor: Shane Perkins, Dunbarton, NH (US)

( * ) Notice: Subject to any disclaimer, the term of this patent is extended or adjusted under 35 U.S.C. 154(b) by 1189 days.

(21) Appl. No.: 16/037,054

(22) Filed: Jul. 17, 2018

(65) Prior Publication Data

US 2019/0072466 A1 Mar. 7, 2019

Related U.S. Application Data

(60) Provisional application No. 62/554,813, filed on Sep. 6, 2017.

(51) Int. Cl.
| | |
|---|---|
| *G01N 1/42* | (2006.01) |
| *B01L 9/00* | (2006.01) |
| *G01N 1/36* | (2006.01) |
| *G01N 1/06* | (2006.01) |
| *G01N 1/28* | (2006.01) |
| *B01L 7/00* | (2006.01) |

(52) U.S. Cl.
CPC ............... *G01N 1/42* (2013.01); *B01L 7/50* (2013.01); *B01L 9/00* (2013.01); *G01N 1/06* (2013.01); *G01N 1/286* (2013.01); *G01N 1/36* (2013.01); *B01L 2300/08* (2013.01); *B01L 2300/12* (2013.01); *B01L 2300/16* (2013.01); *G01N 2001/2873* (2013.01)

(58) Field of Classification Search
CPC G01N 1/42; G01N 1/06; G01N 1/286; G01N 1/36; G01N 2001/2873; B01L 7/50; B01L 9/00; B01L 2300/08; B01L 2300/12; B01L 2300/16
See application file for complete search history.

(56) References Cited

U.S. PATENT DOCUMENTS

| | | |
|---|---|---|
| 4,288,316 A | 9/1981 | Hennessy |
| 4,695,339 A | 9/1987 | Rada |
| 5,161,446 A | 11/1992 | Holbl et al. |
| 5,188,347 A | 2/1993 | Hunnell et al. |
| 5,776,298 A | 7/1998 | Franks |
| 6,199,623 B1 | 3/2001 | Franks |
| 6,536,219 B2 | 3/2003 | Peters |
| 6,558,629 B1 | 5/2003 | Davidson |
| 7,168,694 B2 | 1/2007 | Bui et al. |
| 7,234,308 B1 | 6/2007 | Critz |
| 7,494,823 B2 | 2/2009 | Sukumar |

(Continued)

*Primary Examiner* — Jill A Warden
*Assistant Examiner* — Henry H Nguyen
(74) *Attorney, Agent, or Firm* — Hayes Soloway PC

(57) ABSTRACT

A cryostat chuck is disclosed. The disclosed chuck may be configured for use in a frozen-sectioning device, such as a cryostat, or other suitable host equipment. The disclosed chuck may include a tab portion configured, in accordance with some embodiments, to provide a means for gripping the chuck by hand (e.g., human or robotic) or by a tool or other desired interfacing element. The tab portion may serve to distance a user's hand or piece of gripping equipment from the sharp microtome of the host cryostat, reducing the opportunity of sustaining bodily injury or equipment damage. Moreover, the tab portion may provide a means by which the cryostat chuck may be manipulated when inserting, adjusting, or removing the chuck prior to, during, or after engagement by the cryostat (or other suitable host equipment).

18 Claims, 6 Drawing Sheets

(56) References Cited

U.S. PATENT DOCUMENTS

| | | |
|---|---|---|
| 7,530,557 B2 | 5/2009 | Bui et al. |
| 8,074,545 B1 | 12/2011 | Tabb et al. |
| 8,491,497 B2 | 7/2013 | Houser et al. |
| 8,641,989 B2 | 2/2014 | Marsing et al. |
| D803,414 S * | 11/2017 | Tate .............................. D24/224 |
| D803,415 S * | 11/2017 | Tate ........................ A63F 13/48 |
| | | D24/224 |
| 2004/0152204 A1 | 8/2004 | Gauthier |
| 2005/0247068 A1 | 11/2005 | Marsing et al. |
| 2006/0236703 A1* | 10/2006 | Rada ........................ F25D 3/105 |
| | | 62/62 |
| 2010/0223935 A1 | 9/2010 | Donndelinger |
| 2013/0019725 A1* | 1/2013 | Magavi ................... G01N 1/06 |
| | | 83/98 |
| 2015/0065913 A1* | 3/2015 | Keller ................ A61B 10/0283 |
| | | 600/566 |
| 2016/0299039 A1 | 10/2016 | Hemmings |

\* cited by examiner

CRYOSTAT CHUCK

CROSS-REFERENCE TO RELATED APPLICATIONS

This patent application claims the benefit of U.S. Provisional Patent Application No. 62/554,813, filed on Sep. 6, 2017, and titled "Cryostat Chuck," which is herein incorporated by reference in its entirety.

FIELD OF THE DISCLOSURE

The present disclosure relates to frozen section procedure equipment and more particularly to cryostat equipment.

BACKGROUND

In a typical frozen tissue sectioning procedure, a tissue sample to be cryosectioned is mounted to a specimen chuck using an embedding medium, such as an optimal cutting temperature (OCT) compound. The chuck and mounted specimen are then inserted within a cryostat, which includes a sharp blade known as a microtome, against which the specimen is passed to produce sliced sections, typically of micrometer-range thicknesses. These very thin sections then may be analyzed utilizing known histology techniques.

SUMMARY

The subject matter of this application may involve, in some cases, interrelated products, alternative solutions to a particular problem, and/or a plurality of different uses of a single system or article.

One example embodiment provides a cryostat chuck. The cryostat chuck includes a specimen platform portion. The specimen platform portion includes a specimen mounting surface configured to have a specimen mounted thereat. The specimen platform portion further includes an underside surface disposed opposite the specimen mounting surface. The cryostat chuck further includes a stem portion extending from the underside surface of the specimen platform portion, wherein the stem portion is configured to be engaged by a cryostat. The cryostat chuck further includes a tab portion extending laterally from an edge of the specimen platform portion, wherein the tab portion is configured to be gripped by at least one of a human hand, a robotic hand, and a tool in a manner that permits manipulation of the cryostat chuck at least one of before, during, and after engagement of the stem portion by the cryostat.

In some cases, the tab portion: extends laterally from the edge of the specimen platform portion in a manner substantially perpendicular to a longitudinal length of the stem portion; and is substantially straight along its entire longitudinal length.

In some cases, the tab portion includes a first portion extending laterally from the edge of the specimen platform portion in a manner substantially perpendicular to a longitudinal length of the stem portion, wherein the first portion is substantially straight along its entire longitudinal length. The tab portion further includes a second portion extending from the first portion at an offset angle in a manner not perpendicular to the longitudinal length of the stem portion, wherein: the second portion is substantially straight along its entire longitudinal length; and the offset angle is in the range of about 1-10°.

In some cases, the tab portion includes a first portion extending laterally from the edge of the specimen platform portion in a manner substantially perpendicular to a longitudinal length of the stem portion, wherein the first portion is substantially straight along its entire longitudinal length. The tab portion further includes a second portion extending from the first portion at an offset angle in a manner not perpendicular to the longitudinal length of the stem portion, wherein: the second portion is substantially straight along its entire longitudinal length; and the offset angle is in the range of about 10-20°.

In some cases, the tab portion is of substantially uniform thickness along its entire longitudinal length.

In some cases: a first portion of the tab portion is of a first thickness; and a second portion of the tab portion is of a second thickness that differs from the first thickness.

In some cases, a distal end of the tab portion is of a curved profile of constant radius as measured with respect to a center of the specimen platform portion.

In some cases, a longitudinal length of the tab portion is greater than a longitudinal length of the stem portion.

In some cases, a longitudinal length of the tab portion is less than or substantially equal to a diameter or width of the specimen platform portion.

In some cases, a width of the tab portion is less than or substantially equal to a diameter or width of the stem portion.

In some cases, a thickness of the tab portion is less than or substantially equal to a thickness of the specimen platform portion.

In some cases, the tab portion is physically textured with a texture configured to reduce slippage during manipulation of the cryostat chuck via the tab portion.

In some cases, the cryostat chuck further includes a slip-resistant layer disposed over the tab portion and configured to reduce slippage during manipulation of the cryostat chuck via the tab portion.

In some cases, the tab portion includes at least one visual indicator indicative of information pertaining to at least one of: the specimen to be mounted at the specimen platform portion; a size of the cryostat chuck; a type of pattern provided by the specimen mounting surface of the specimen platform portion; and a compatibility of the cryostat chuck with one or more cryostats.

In some cases, the specimen platform portion is patterned with a pattern including a plurality of concentric ridges and trenches arranged over the specimen mounting surface. In some such instances, the pattern further includes at least one linear trench arranged over the specimen mounting surface such that at least one of the concentric ridges and trenches is interrupted in continuity. In some such instances, the at least one linear trench consists of two linear trenches arranged perpendicular to one another over the specimen mounting surface.

In some cases, the specimen platform portion and the tab portion are of monolithic construction.

In some cases, at least a portion of the cryostat chuck includes at least one of stainless steel, copper, brass, or an alloy of any thereof.

In some instances, at least a portion of the cryostat chuck is coated with at least one of polytetrafluoroethylene (PTFE), chrome, and stainless steel.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1A:
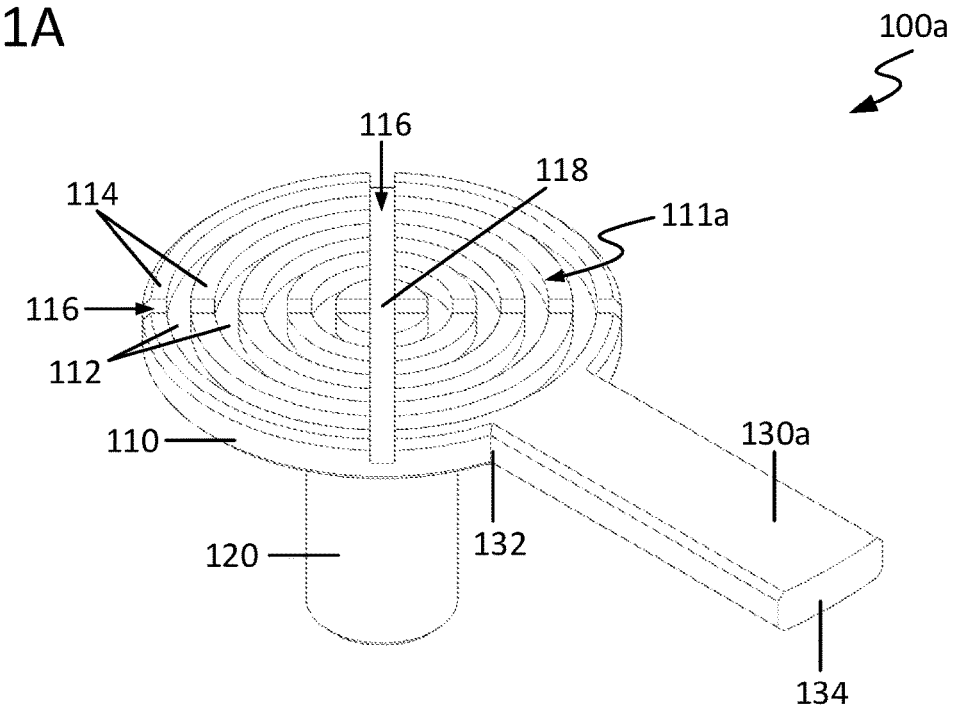
FIG. 1A illustrates an isometric view of a cryostat chuck configured in accordance with an embodiment of the present disclosure.
Figure 1B:
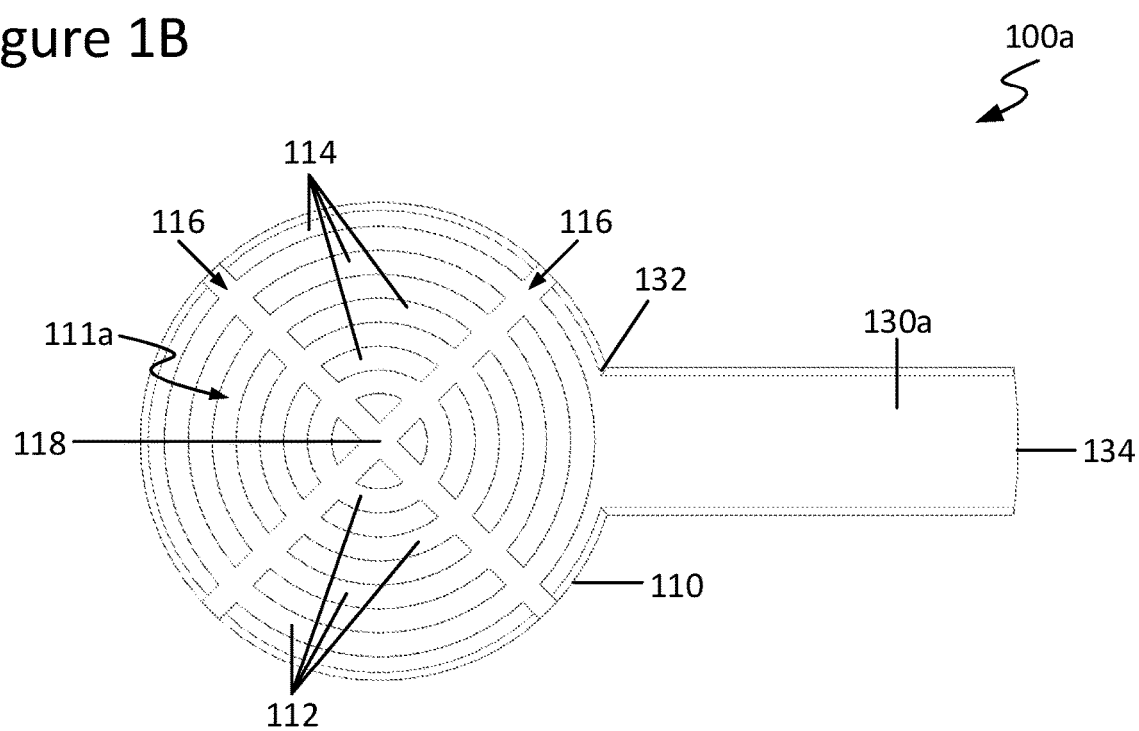
FIG. 1B illustrates a top-down plan view of the cryostat chuck of FIG. 1A.
Figure 1C:
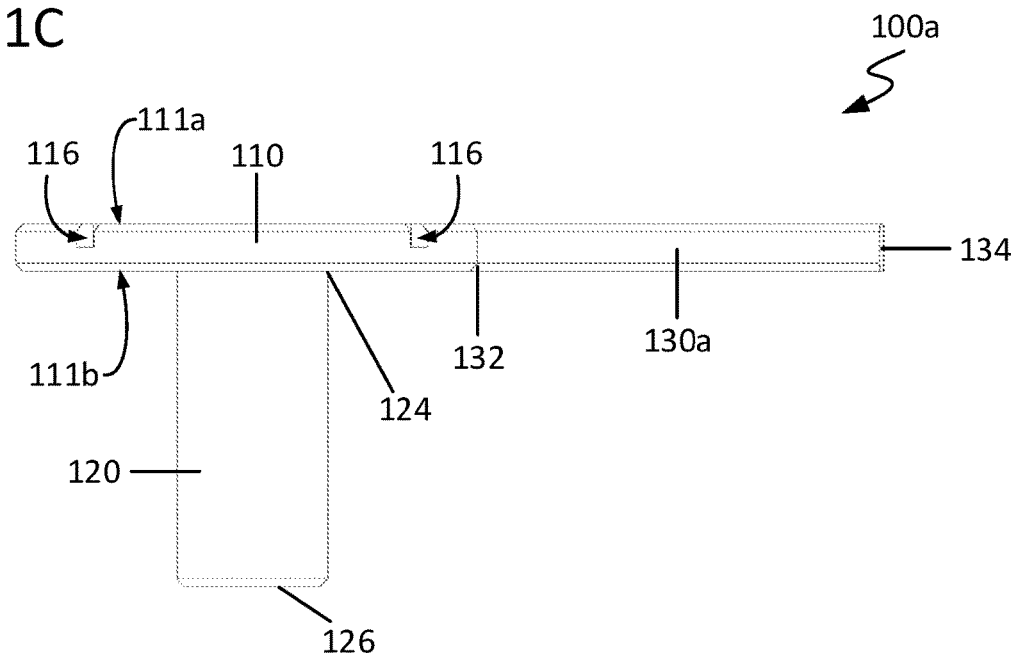
FIGS. 1C-1D illustrate side elevation views of the cryostat chuck of FIG. 1A.
Figure 1D:
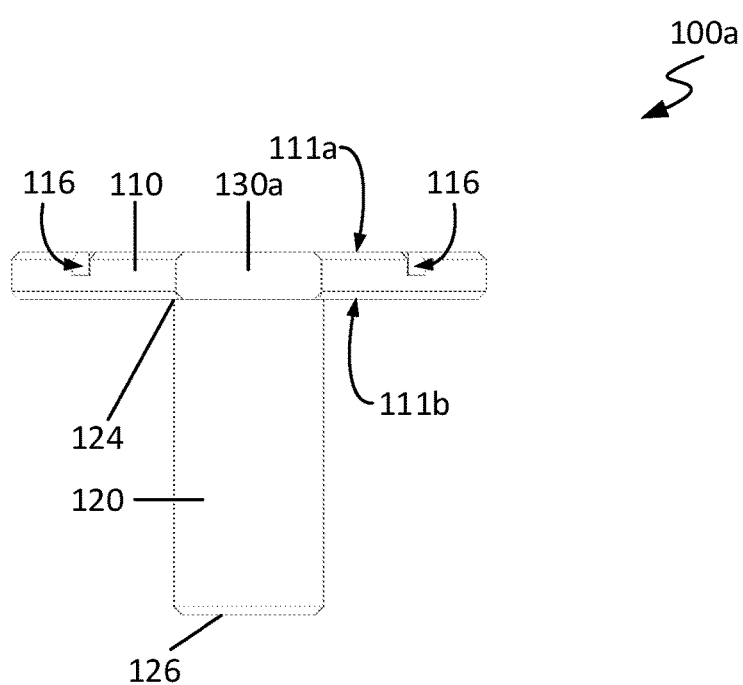

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown. For instance, while some figures generally indicate straight lines, right angles, and smooth surfaces, an actual implementation of the disclosed embodiment(s) may have less than perfect straight lines and right angles, and some features may have surface topography or otherwise be non-smooth, given real world limitations of fabrication processes. In short, the figures are provided merely to show example structures.

DETAILED DESCRIPTION

A cryostat chuck is disclosed. The disclosed chuck may be configured for use in a frozen-sectioning device, such as a cryostat, or other suitable host equipment. The disclosed chuck may include a tab portion configured, in accordance with some embodiments, to provide a means for gripping the chuck by hand (e.g., human or robotic) or by a tool or other desired interfacing element. The tab portion may serve to distance a user's hand or piece of gripping equipment from the sharp microtome of the host cryostat, reducing the opportunity of sustaining bodily injury or equipment damage. Moreover, the tab portion may provide a means by which the cryostat chuck may be manipulated when inserting, adjusting, or removing the chuck prior to, during, or after engagement by the cryostat (or other suitable host equipment). Numerous configurations and variations will be apparent in light of this disclosure.

General Overview

Installation, manipulation, and removal of existing cryostat chucks are hazardous endeavors given the proximity of the sharp microtome of the cryostat. An operator's hand or other tool utilized by the operator can contact the sharp microtome, resulting in bodily injury and possibly damaging the equipment. Moreover, as cryostat chucks normally are subjected to very cold temperatures to ensure sufficient freezing of the sample and mounting material (e.g., OCT), an operator's hand may be exposed to those dangerously cold temperatures when manually handling the frozen chucks and maneuvering them into position within the cryostat.

Thus, and in accordance with some embodiments of the present disclosure, a cryostat chuck is disclosed. The disclosed chuck may be configured for use in a frozen-sectioning device, such as a cryostat, or other suitable host equipment. The disclosed chuck may include a tab portion configured, in accordance with some embodiments, to provide a means for gripping the chuck by hand (e.g., human or robotic) or by a tool or other desired interfacing element. The tab portion may serve to distance a user's hand or other piece of gripping equipment from the sharp microtome of the host cryostat, reducing the opportunity of sustaining bodily injury or equipment damage. Moreover, the tab portion may provide a means by which the cryostat chuck may be manipulated when inserting, adjusting, or removing the chuck prior to, during, or after engagement by the cryostat (or other suitable host equipment).

In some embodiments, a cryostat chuck provided as described herein may include a straight tab portion, whereas in some other embodiments, an angled tab portion may be provided. In some instances, the tab portion may be textured or include a slip-resistant layer to reduce slippage when being gripped. In some instances, the tab portion may host one or more indicator features, which may be indicative to a user (or other operator) of information relevant to a given specimen to be mounted or the cryostat chuck itself, among other options. In some instances, the tab portion may thermally insulate a user's hand (or other interfacing element) from the cold temperatures typically employed in preparing and utilizing a cryostat chuck.

In accordance with some embodiments, the tab portion may provide a means by which the associated cryostat chuck may be manipulated with ease and safety via a user's hand, a robotic hand, or a suitable tool, for example. Moreover, the tab portion may allow for quick and easy insertion, adjustment, and removal of the cryostat chuck when used with a cryostat device. In accordance with some embodiments, the disclosed chuck may be configured for use in one or more existing cryostat devices (or other suitable host equipment) without requiring modification or retrofitting. In some other cases, however, the disclosed chuck may be configured for use with an adapter (or other intervening compatibility facilitator). Furthermore, the disclosed cryostat chuck may be manufactured via any one, or combination, of additive and subtractive manufacturing processes, including, for example, three-dimensional (3D) printing, reducing manufacturing time and costs.

Structure and Operation

FIGS. 1A-1D illustrate several views of a cryostat chuck 100a configured in accordance with an embodiment of the present disclosure. FIGS. 2A-2D illustrate several views of a cryostat chuck 100b configured in accordance with another embodiment of the present disclosure. For consistency and ease of understanding of the present disclosure, chuck 100a (FIGS. 1A-1D) and chuck 100b (FIGS. 2A-2D) may be collectively referred to herein generally as chuck 100, except where separately referenced.

As can be seen, chuck 100 includes a specimen platform 110. Specimen platform 110 may be configured, in accordance with some embodiments, to have a specimen mounted thereat for frozen sectioning in a cryostat (or other suitable host equipment). To such end, specimen platform 110 may include a specimen mounting surface 111*a* to which a specimen may be mounted either directly or indirectly, for instance, via an optimal cutting temperature (OCT) compound or other suitable mounting means, as will be apparent in light of this disclosure. More generally, in cases of indirect mounting, one or more intervening layers between the specimen and specimen mounting surface 111*a* may be provisioned.

The geometry of specimen platform 110 may be customized, as desired for a given target application or end-use. In some embodiments, such as that illustrated in FIGS. 1A-1D and 2A-2D, specimen platform 110 may be generally circular, elliptical, or some other closed-curve shape. In some other embodiments, however, specimen platform 110 may be generally polygonal (e.g., square, rectangular, or other multi-sided polygon) in shape. In some embodiments, such as that illustrated in FIGS. 1A-1D and 2A-2D, specimen platform 110 may be generally cylindrical in geometry. In some other embodiments, however, specimen platform 110 may be generally prismatic in geometry.

In some embodiments, specimen mounting surface 111*a* may be substantially planar in a manner substantially perpendicular to the longitudinal length of stem portion 120 (discussed below). In some other embodiments, however, specimen mounting surface 111*a* may be substantially planar in a manner that is not perpendicular to the longitudinal length of stem portion 120. Thus, specimen mounting surface 111*a* may be offset at a given angle such that the planar specimen mounting surface 111*a* lies acute (or obtuse, as the case may be) to the longitudinal length of stem portion 120.

In some embodiments, specimen mounting surface 111*a* may be of substantially smooth surface contour. In some other embodiments, however, specimen mounting surface 111*a* may be of non-smooth surface contour. For instance, specimen mounting surface 111*a* may include a pattern configured, in accordance with some embodiments, to facilitate provision of a strong mounting of a specimen to specimen platform 110, especially in cases where an OCT compound or other adhesive mounting material is employed.

Such an optional pattern for specimen mounting surface 111*a* may have any of a wide range of configurations. In some embodiments, the pattern of specimen mounting surface 111*a* may include a plurality of concentric trenches 112 and ridges 114. The quantity and pitch of concentric trenches 112 and ridges 114 may be customized, as desired for a given target application or end-use. As can be seen further, in some instances, one or more linear trenches 116 may span the diameter/width of specimen platform 110 (in part or in whole), interrupting one or more concentric trenches 112 and ridges 114. In some cases, the pattern of specimen mounting surface 111*a* may include a pair of substantially perpendicularly oriented linear trenches 116.

The present disclosure is not intended to be so limited, however. For instance, in some other embodiments, the pattern of specimen mounting surface 111*a* may include a plurality of concentric trenches 112 and ridges 114 uninterrupted by any linear trench 116. In some other embodiments, the pattern of specimen mounting surface 111*a* may include a gridwork, latticework, or other matrix of linear trenches and ridges spanning the diameter/width of specimen platform 110 (in part or in whole). Thus, in such cases, a first parallel plurality of trenches and ridges running in a first direction may be interrupted, in part or in whole, by a second parallel plurality of trenches and ridges running in a different second direction, in some instances providing a generally waffle-like pattern. These first and second pluralities may be substantially perpendicular to one another or offset from one another at some other desired angle to provide a pattern of a given target configuration. Numerous configurations for the optional patterning of specimen mounting surface 111*a* will be apparent in light of this disclosure.

Chuck 100 may include a stem portion 120 extending from an underside surface 111*b* of specimen platform 110. Stem portion 120 may be configured, in accordance with some embodiments, to be inserted within or otherwise received and retained by a chuck retention portion of a cryostat device (or other suitable host equipment). In some cases, stem portion 120 may be engaged directly by a cryostat device (or other suitable host equipment), whereas in some other cases, an adapter or other intervening compatibility facilitator may be employed in providing engagement. In a more general sense, it may be desirable, at least in some instances, to provision a stem portion 120 configured such that chuck 100 may be utilized, without modification or retrofitting, in one or more existing cryostat devices (or other suitable host equipment).

The geometry of stem portion 120 may be customized, as desired for a given target application or end-use. In some embodiments, such as that illustrated in FIGS. 1A-1D and 2A-2D, stem portion 120 may be generally cylindrical in shape, having a generally circular, elliptical, or other closed-curve cross-sectional geometry. In some other embodiments, however, stem portion 120 may be generally prismatic in shape, having a generally square, rectangular, or other polygonal cross-sectional geometry.

Figure 2A:
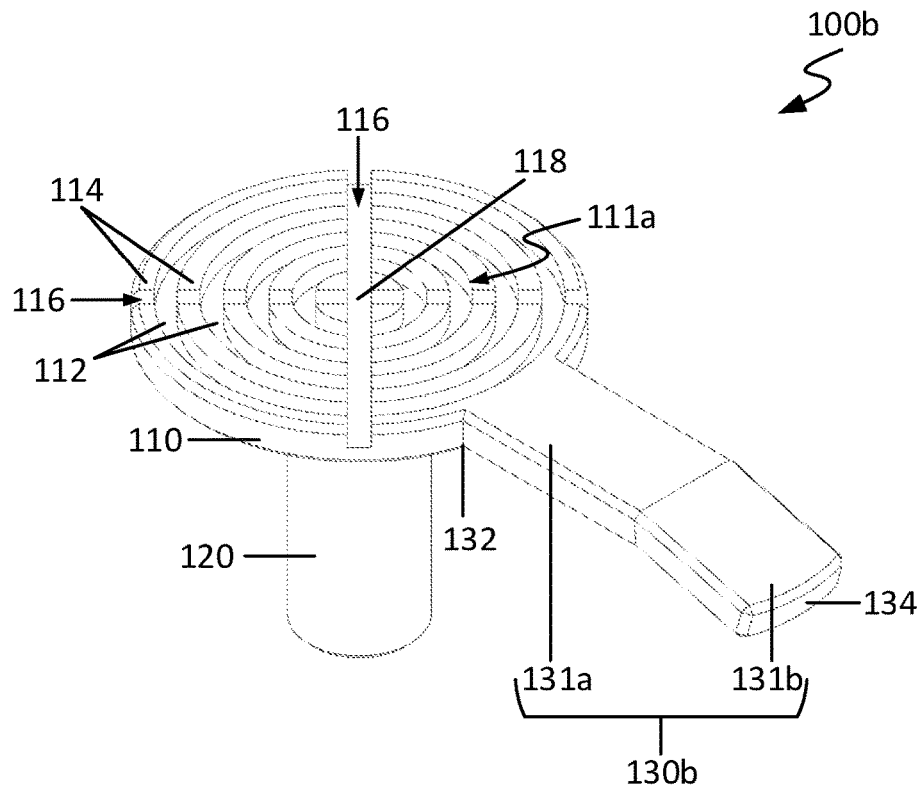
FIG. 2A illustrates an isometric view of a cryostat chuck configured in accordance with another embodiment of the present disclosure.
Figure 2B:
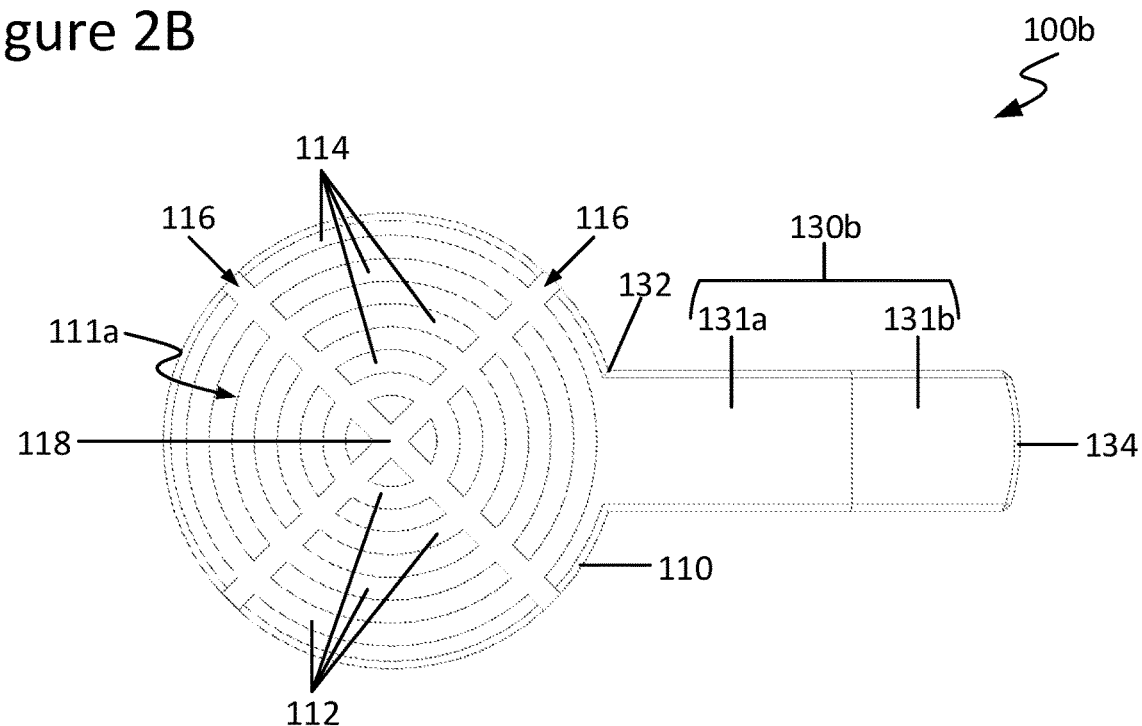
FIG. 2B illustrates a top-down plan view of the cryostat chuck of FIG. 2A.
Figure 2C:
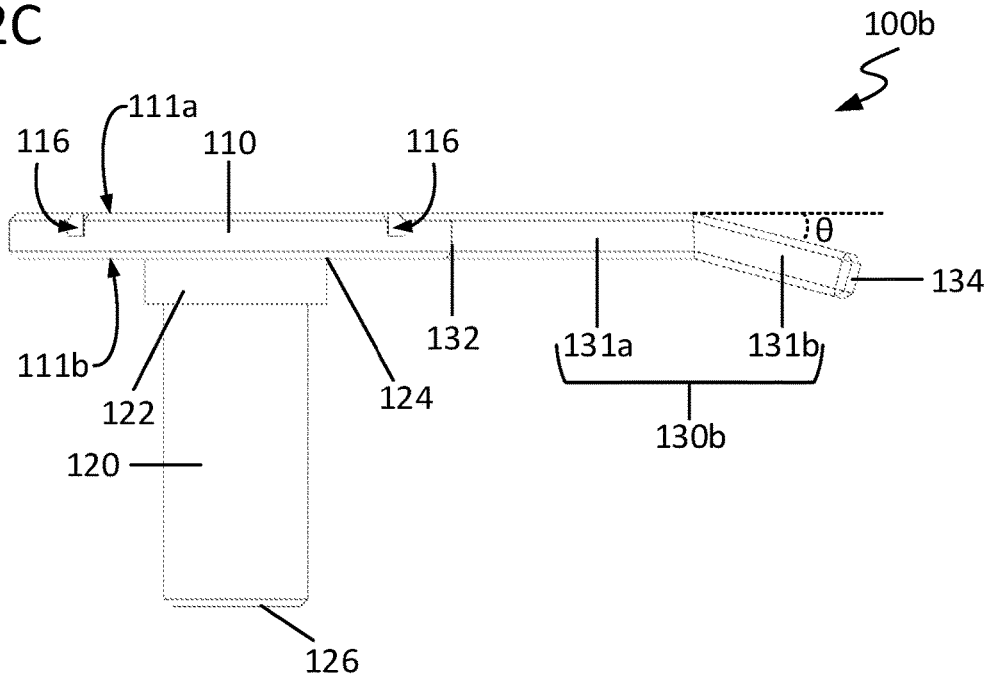
FIGS. 2C-2D illustrate side elevation views of the cryostat chuck of FIG. 2A.
Figure 2D:
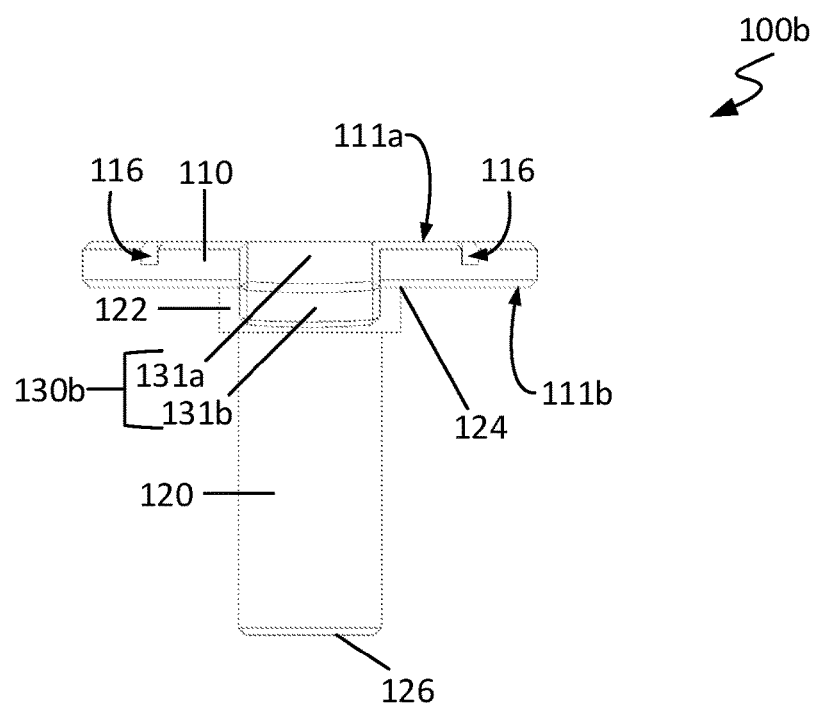

As can be seen from FIGS. 2C-2D, for example, in some embodiments, chuck 100 optionally may include a flange portion 122 at a proximal end 124 of stem portion 120. When included, optional flange portion 122 may be configured, in accordance with some embodiments, to facilitate engagement (e.g., flush interfacing and secure seating or gripping) of stem portion 120 by a cryostat device (or other suitable host equipment). In some embodiments, flange portion 122 may be of greater width/diameter than stem portion 120, providing a lip or otherwise stepped region near proximal end 124 of stem portion 120. The height/length (e.g., along the longitudinal length of stem portion 120) and diameter/width (e.g., radially from stem portion 120) of optional flange portion 122 may be customized, as desired for a given target application or end-use.

In accordance with some embodiments, chuck 100 further may include a straight tab portion 130*a* (e.g., such as with chuck 100*a* illustrated via FIGS. 1A-1D) or an angled tab portion 130*b* (e.g., such as with chuck 100*b* illustrated via FIGS. 2A-2D). For consistency and ease of understanding of the present disclosure, straight tab portion 130*a* (FIGS. 1A-1D) and angled tab portion 130*b* (FIGS. 2A-2D) may be collectively referred to herein generally as tab portion 130, except where separately referenced. Tab portion 130 may be configured, in accordance with some embodiments, to provide a means for gripping chuck 100 (e.g., by a hand, a tool, or other desired interfacing element) when inserting, removing, or otherwise manipulating chuck 100 prior to, during, or after engagement with a chuck retention portion of a cryostat device (or other suitable host equipment).

As can be seen in FIGS. 1A-1D, straight tab portion 130*a* may extend substantially laterally from specimen platform 110, substantially perpendicular to the longitudinal length of stem portion 120, with a proximal end 132 of straight tab portion 130*a* interfacing with an edge of specimen platform 110. As generally shown in FIGS. 1A-1D, straight tab portion 130a may be substantially straight along its entire longitudinal length.

As can be seen in FIGS. 2A-2D, angled tab portion 130b may extend substantially laterally from specimen platform 110, substantially perpendicular to the longitudinal length of stem portion 120, with a proximal end 132 of angled tab portion 130b interfacing with an edge of specimen platform 110. As generally shown in FIGS. 2A-2D, angled tab portion 130b may not be substantially straight along its entire longitudinal length. Rather, angled tab portion 130b may include: (1) a first portion 131a; and (2) a second portion 131b extending from first portion 131a, diverging from the plane of first portion 131a at an angle θ (see FIG. 2C) in a direction toward the longitudinal length of stem portion 120. As further can be seen, first portion 131a may be substantially straight along its entire longitudinal length, and second portion 131b may be substantially straight along its entire longitudinal length, at least in some cases.

The angle θ of divergence of second portion 131b may be customized, as desired for a given target application or end-use. In some cases, angle θ may be in the range of about 1-10° (e.g., about 1-5°, about 5-10°, or any other sub-range in the range of about 1-10°). In some other cases, angle θ may be in the range of about 10-20° (e.g., about 10-15°, about 15-20°, or any other sub-range in the range of about 10-20°). In some still other cases, angle θ may be about 20° or greater (e.g., about 25° or greater, about 30° or greater, and so forth).

It should be noted, however, that the present disclosure is not intended to be so limited only to the example tab portions 130a, 130b illustrated. For instance, in a more general sense, tab portion 130 may be straight, bent, articulated, or curved to any degree any in any desired location along its longitudinal length. Moreover, in accordance with some embodiments, tab portion 130 may be substantially bar-like or rod-like, being: (1) generally prismatic in shape, having a generally square, rectangular, or other polygonal cross-sectional geometry; or (2) generally cylindrical in shape, having a generally circular, elliptical, or other closed-curve cross-sectional geometry. Numerous configurations and variations for tab portion 130 will be apparent in light of this disclosure.

In some embodiments, chuck 100 may be configured such that specimen platform 110 and tab portion 130 together are of monolithic construction, constituting a singular unitary piece. In some other embodiments, however, chuck 100 may be configured such that specimen platform 110 and tab portion 130 are of polylithic construction, constituting separate pieces that may be operatively coupled with one another (e.g., as an assembly), in a temporary or permanent manner. Assembly may be provided via any one, or combination, of fastener, friction fit, threaded, mated engagement, adhesive, magnetic, or any other suitable means, as will be apparent in light of this disclosure.

As will be appreciated in light of this disclosure, it may be desirable, at least in some cases, to eliminate (or otherwise reduce) the opportunity for slippage when tab portion 130 is being gripped by a hand (e.g., human or robotic), a tool, or other desired interfacing element. To that end, and in accordance with some embodiments, tab portion 130 optionally may be textured, directly or indirectly (e.g., via a textured material, coating, or element disposed on tab portion 130), with a texture that helps to prevent (or otherwise reduce) slippage. For instance, in some cases, tab portion 130 may be physically textured with one or more roughened, raised, treaded, ribbed, latticed, stepped, or other gripping feature(s). In some such cases where tab portion 130 is directly textured, additive or subtractive manufacturing process(es) may be employed, as desired. In some cases, tab portion 130 may be covered, in part or in whole, by a slip-resistant coating, sleeve, finish, wrap, or other layer(s). In some such cases where tab portion 130 is indirectly textured, any of the various textures noted above may be provided, in accordance with some embodiments. Numerous additional and alternative approaches to reducing slippage for tab portion 130 will be apparent in light of this disclosure.

In accordance with some embodiments, tab portion 130 optionally may include one or more indicators, visual or otherwise, signifying to a user (or other controller) one or more details about the specific specimen to be mounted to chuck 100 or, more generally, the type and/or configuration of chuck 100. For example, tab portion 130 may be configured to have provided thereat one or more alphanumeric, icon, image, color, or other suitable marker(s), which may be indicative to a user (or other controller) of certain information pertaining to any of a wide range of details. For instance, tab portion 130 may have an indicator indicative of the specimen currently mounted to specimen platform 110, the size of chuck 100, the type of pattern for specimen mounting surface 111a, or the compatibility of chuck 100 with a particular cryostat device (or other suitable host equipment), to name a few options. Thus, in this manner, a user (or other controller) may be able to inspect a given chuck 100, visually or otherwise, and readily and easily determine details pertinent to its use, in accordance with some embodiments. Other suitable optional indication means for chuck 100 will depend on a given application and will be apparent in light of this disclosure.

As will be appreciated in light of this disclosure, the material construction of chuck 100, including any of its various portions individually and collectively, may be customized, as desired for a given target application or end-use. In some cases, chuck 100 may be formed entirely of one or more designated materials, whereas in some other cases, a first portion of chuck 100 may be formed from a first material, and a second portion of chuck 100 may be formed from a different second material. Some example suitable construction materials for chuck 100 may include: a metal, such as stainless steel, copper, or brass, or an alloy of any thereof; a plastic; a composite; a ceramic; a glass; or a combination of any one or more of the aforementioned. In some embodiments, chuck 100 may be covered, in part or in whole, with a non-tarnishing or other coating material. For instance, in some cases, chuck 100 may be at least partially coated with polytetrafluoroethylene (PTFE), chrome, or stainless steel, to name a few options. Other suitable material(s) selections for chuck 100 will depend on a given application and will be apparent in light of this disclosure.

As will be further appreciated in light of this disclosure, the dimensions of chuck 100, including any of its various portions individually and collectively, may be customized, as desired for a given target application or end-use. At least in some instances, it may be desirable to provision a chuck 100 of suitable dimensions such that tab portion 130 may be gripped or otherwise engaged by a hand (e.g., human or robotic), a tool, or other desired interfacing element which might be used in inserting, removing, or otherwise manipulating chuck 100 prior to, during, or after engagement with a chuck retention portion of a cryostat device (or other suitable host equipment).

Figure 3:
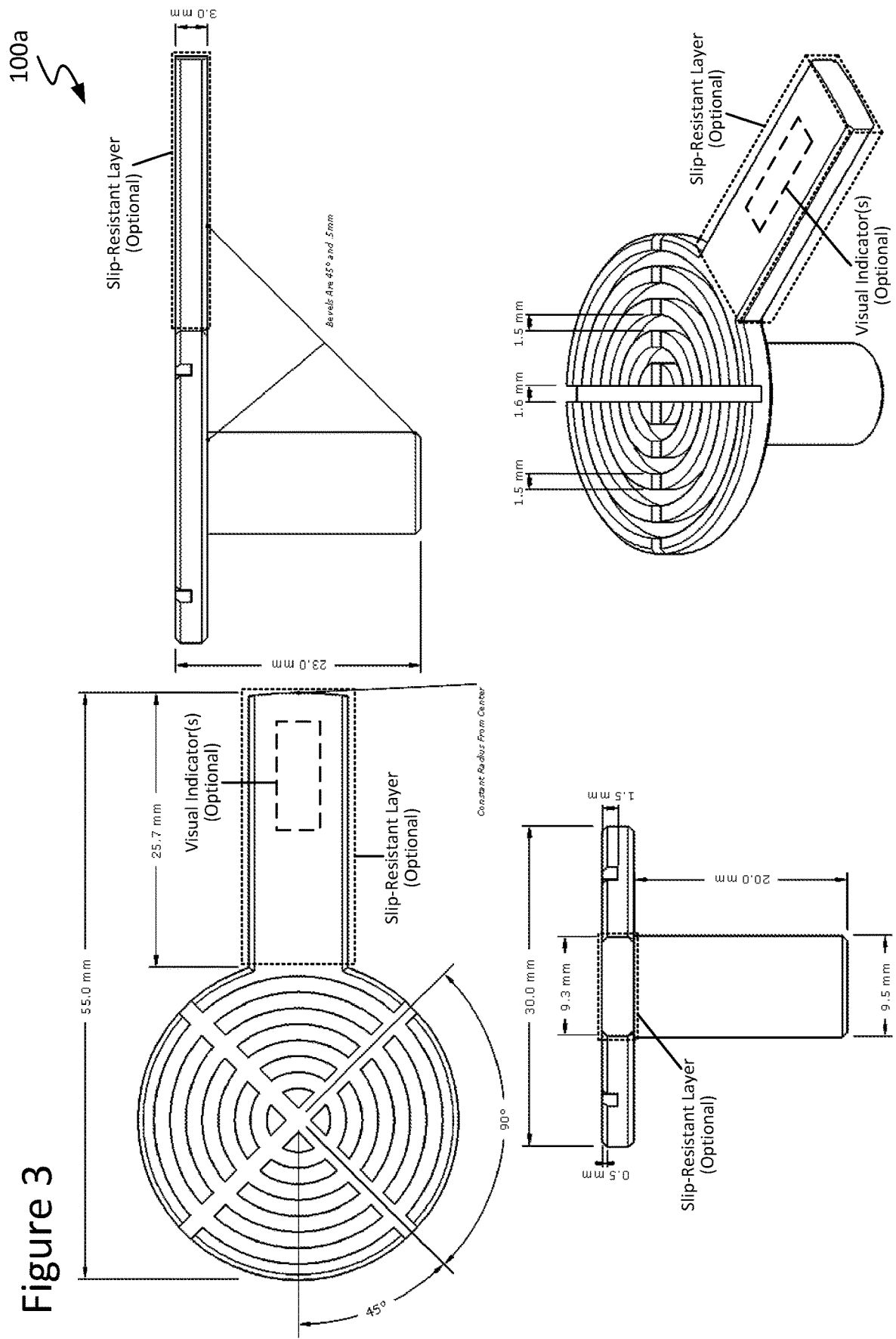
FIG. 3 illustrates several views of a cryostat chuck configured in accordance with an example embodiment of the present disclosure.
Figure 4:
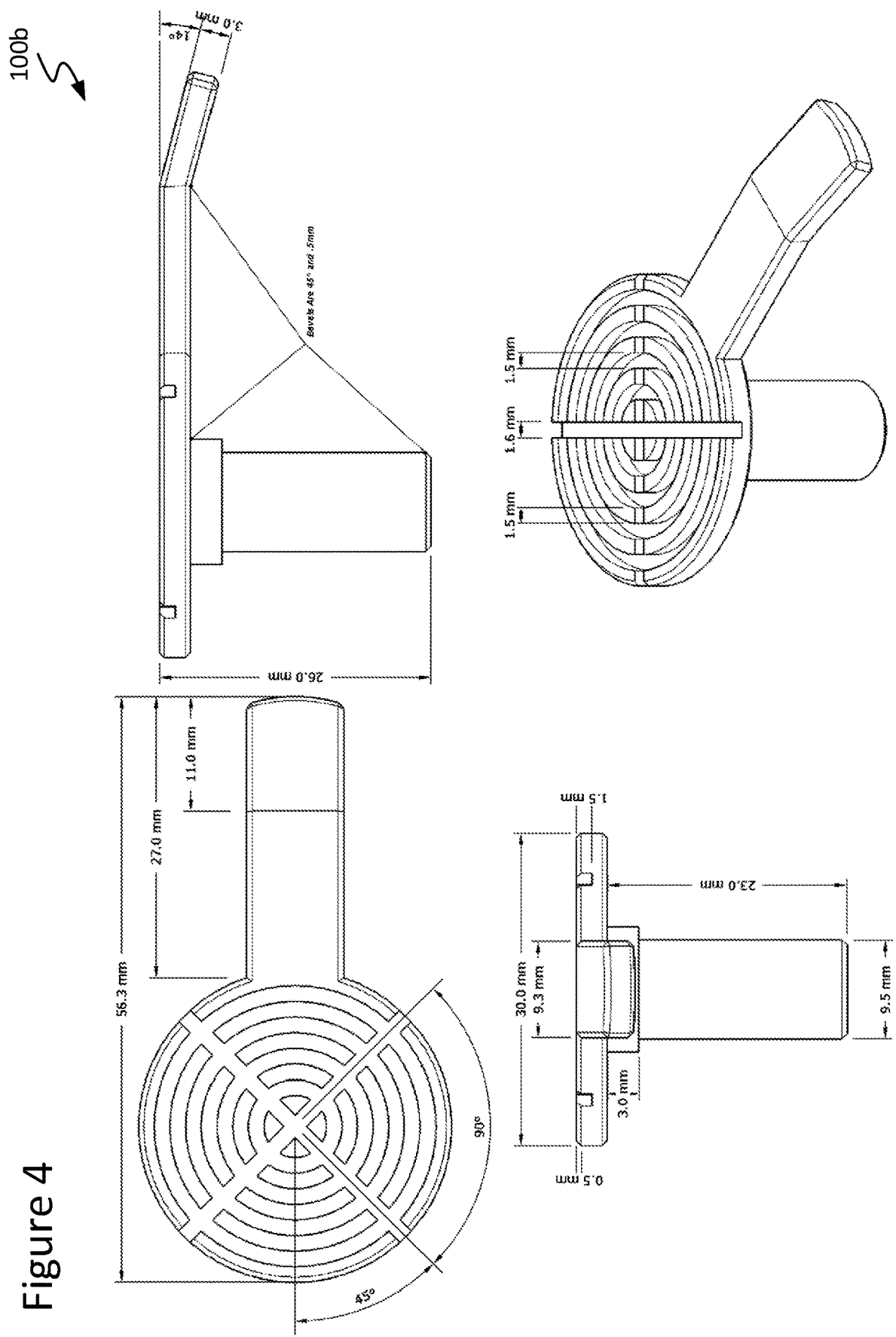
FIG. 4 illustrates several views of a cryostat chuck configured in accordance with another example embodiment of the present disclosure.

FIG. 3 illustrates several views of a cryostat chuck 100 configured in accordance with an example embodiment of the present disclosure. FIG. 4 illustrates several views of a cryostat chuck 100 configured in accordance with another example embodiment of the present disclosure. Regarding FIGS. 3-4, these illustrations include numerous example dimensions with which chuck 100 may be provisioned, in accordance with some embodiments. However, the present disclosure is not intended to be so limited, as in accordance with some other embodiments, the various dimensions of a given chuck 100, including any of its various portions individually and collectively, may be greater or less than the example numerical ranges shown in FIGS. 3-4. In an example case, the scale for the example chucks 100a, 100b shown via FIGS. 3-4 may be such that 3 mm equals 1 mm.

In some cases, specimen platform 110 may have a diameter/width in the range of about 30.0 mm±20.0 mm. In some cases, specimen platform 110 may have a thickness in the range of about 5.0 mm±2.5 mm. In some cases, specimen platform 110 may be of substantially uniform thickness, whereas in some other cases, its thickness may vary in one or more regions.

As previously discussed, specimen platform 110 optionally may be patterned with a pattern including one or more trenches 112, 116 and one or more ridges 114. In some cases, a given trench 112, 116 or ridge 114 may have a depth in the range of about 1.5 mm±1.0 mm. In some cases, a given trench 112, 116 or ridge 114 may have a width in the range of about 1.5 mm±1.0 mm. In some instances, a given trench 112, 116 or ridge 114 may have a generally U-shape profile, which may be smooth in contour or non-smooth with one or more facets and vertices. The spacing (e.g., pitch) between consecutive concentric trenches 112 or ridges 114 may be constant or varied across specimen mounting surface 111a of specimen platform 110. In some instances, a given linear trench 116 may be offset from another given linear trench 116 at an angle in the range of about 15-165° (e.g., 45°, 90°, 135°).

In some cases, stem portion 120 may have a longitudinal length in the range of about 20.0 mm±10.0 mm. In some cases, stem portion 120 may have a diameter/width in the range of about 10.0 mm±5.0 mm. As previously discussed, stem portion 120 optionally may include a flange portion 122. In some cases, optional flange portion 122 may have a height/length in the range of about 3.0 mm±2.0 mm. In some cases, optional flange portion 122 may have a diameter/width in the range of about 15.0 mm±5.0 mm.

In some cases, tab portion 130 may have a longitudinal length in the range of about 25.0 mm±10.0 mm. In some cases, tab portion 130 may have a width in the range of about 10.0 mm±5.0 mm. In some cases, tab portion 130 may have a thickness in the range of about 5.0 mm±2.5 mm. In some instances, tab portion 130 may be of substantially uniform thickness, whereas in some other instances, its thickness may vary in one or more regions. In some cases, distal end 134 of tab portion 130 may be curved in profile. In some such cases, the curve of distal end 134 may have a constant radius as measured, for instance, with respect to center 118 of specimen platform 110. In some cases of an angled tab portion 130b, first portion 131a may have a longitudinal length in the range of about 15.0 mm±5.0 mm, and second portion 131b may have a longitudinal length in the range of about 10.0 mm±5.0 mm.

In some cases, chuck 100 may have a total length, as measured from distal end 134 of tab portion 130 to an opposing end of specimen platform 110, in the range of about 50.0 mm 25.0 mm. In some cases, chuck 100 may have a total height, as measured from distal end 126 of stem portion 120 to the opposing specimen mounting surface 111a of specimen platform 110, in the range of about 30.0 mm±15.0 mm.

In some cases, the longitudinal length of tab portion 130 may be less than or substantially equal to the diameter/width of specimen platform 110. In some other cases, however, the longitudinal length of tab portion 130 may be greater than the diameter/width of specimen platform 110. In some cases in which chuck 100 includes an angled tab portion 130b, the longitudinal length of second portion 131b may be less than the longitudinal length of first portion 131a. In some other cases, however, the longitudinal length of second portion 131b may be greater than or equal to the longitudinal length of first portion 131a. In some instances, the width of tab portion 130 may be less than or substantially equal to the diameter/width of stem portion 120. In some other instances, however, the width of tab portion 130 may be greater than the diameter/width of stem portion 120.

In some cases, tab portion 130 may be of substantially the same thickness as specimen platform 110; thus, a first surface of tab portion 130 may be substantially co-planar with specimen mounting surface 111a, and an opposing second surface of tab portion 130 may be substantially co-planar with underside surface 111b. In some other embodiments, however, tab portion 130 and specimen platform 110 may be of differing thicknesses; thus, either (or both) a first surface of tab portion 130 may not be co-planar with specimen mounting surface 111a, and an opposing second surface of tab portion 130 may not be co-planar with underside surface 111b.

In accordance with some embodiments, any (or each) of specimen platform 110, stem portion 120, and tab portion 130 optionally may be chamfered or beveled, in part or in whole. For example, in some cases, a perimeter of specimen platform 110 may be at least partially chamfered. In some cases, one or more sides of tab portion 130 may be at least partially chamfered. In some cases, a distal end 134 of tab portion 130 may be at least partially chamfered. In some cases, a distal end 126 of stem portion 120 may be at least partially chamfered. For a given chamfered portion of chuck 100, the chamfer angle and height/depth may be customized, as desired for a given target application or end-use. In some cases, a given chamfer may have a height/depth in the range of about 0.5 mm±0.3 mm. In some cases, a given chamfer may have a chamfer angle in the range of about 45.0°±15.0°.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:
1. A cryostat chuck comprising:
 a specimen platform portion comprising:
  a specimen mounting surface configured to have a specimen mounted thereat; and
  an underside surface disposed opposite the specimen mounting surface;
  wherein the specimen mounting surface is patterned with a plurality of ridges and trenches;

a stem portion extending from the underside surface of the specimen platform portion, wherein the stem portion is configured to be engaged by a cryostat; and a tab portion formed as an elongate bar or rod which extends laterally from an arcuate edge of the specimen platform portion, wherein the tab portion is configured to be gripped in a manner that permits manipulation of the cryostat chuck during engagement and disengagement of the stem portion by the cryostat, wherein an uppermost surface of the tab portion is coplanar with an uppermost surface of the plurality of ridges such that there is a difference in elevation between the uppermost surface of the tab portion and the trenches.

2. The cryostat chuck of claim 1, wherein the tab portion:
extends laterally from the arcuate edge of the specimen platform portion in a manner substantially perpendicular to a longitudinal length of the stem portion; and
is substantially straight along an entire longitudinal length thereof.

3. The cryostat chuck of claim 1, wherein the tab portion comprises:
a first portion extending laterally from the arcuate edge of the specimen platform portion in a manner substantially perpendicular to a longitudinal length of the stem portion, wherein the first portion is substantially straight along an entire longitudinal length thereof; and
a second portion extending from the first portion at an offset angle in a manner not perpendicular to the longitudinal length of the stem portion, wherein:
the second portion is substantially straight along an entire longitudinal length thereof; and
the offset angle is in the range of about 1-20°.

4. The cryostat chuck of claim 3, wherein the second portion constitutes less than one-half of an entire longitudinal length of the tab portion.

5. The cryostat chuck of claim 3, wherein the longitudinal length of the second portion is less than the longitudinal length of the first portion.

6. The cryostat chuck of claim 1, wherein a distal end of the tab portion is of a curved profile of constant radius as measured with respect to a center of the specimen platform portion, wherein the curved profile extends concentrically in a same plane as the arcuate edge of the specimen platform portion.

7. The cryostat chuck of claim 1, wherein a longitudinal length of the tab portion is at least one of:
greater than a longitudinal length of the stem portion; and
less than or substantially equal to a diameter or width of the specimen platform portion.

8. The cryostat chuck of claim 1, wherein at least one of:
the tab portion is physically textured with a texture configured to reduce slippage during manipulation of the cryostat chuck via the tab portion;
the cryostat chuck further comprises a slip-resistant layer disposed over the tab portion and configured to reduce slippage during manipulation of the cryostat chuck via the tab portion; and
the tab portion includes at least one visual indicator indicative of information pertaining to at least one of:
the specimen to be mounted at the specimen platform portion;
a size of the cryostat chuck;
a type of pattern provided by the specimen mounting surface of the specimen platform portion; and
a compatibility of the cryostat chuck with one or more cryostats.

9. The cryostat chuck of claim 1, wherein the specimen mounting surface is further patterned with at least one linear trench such that at least one of the ridges and trenches is intersected by the at least one linear trench and interrupted in continuity thereby.

10. The cryostat chuck of claim 9, wherein the at least one linear trench consists of two linear trenches arranged substantially perpendicular to one another.

11. The cryostat chuck of claim 10, wherein:
the two linear trenches divide the specimen mounting surface into quadrants; and
the tab portion adjoins the specimen mounting portion in only one of the quadrants.

12. The cryostat chuck of claim 1, wherein a proximal end of the tab portion adjoins the specimen platform portion in a manner which produces a corner between the arcuate edge of the specimen platform portion and a side edge of the tab portion, wherein the side edge is substantially perpendicular to the uppermost surface of the tab portion.

13. The cryostat chuck of claim 1, wherein:
the specimen mounting portion is of substantially circular shape; and
the tab portion adjoins the specimen mounting portion in only one quadrant of the specimen mounting portion.

14. The cryostat chuck of claim 1, further comprising a flange portion connecting the stem portion and the specimen platform portion, wherein the flange portion is of greater diameter or width than the stem portion and is configured to facilitate secure seating of the stem portion with respect to the cryostat.

15. The cryostat chuck of claim 1, wherein a lowermost surface of the tab portion is coplanar with the underside surface of the specimen platform portion.

16. The cryostat chuck of claim 15, wherein the tab portion has two side edges that extend substantially parallel to one another and substantially perpendicular to at least one of the uppermost surface of the tab portion and the lowermost surface of the tab portion.

17. The cryostat chuck of claim 16, wherein at least one of:
a maximum width of the tab portion, as measured in a direction extending from one of the two side edges of the tab portion to the other of the two side edges of the tab portion, is less than or substantially equal to a diameter or width of the stem portion measured in the same direction; and
a maximum thickness of the tab portion, as measured in a direction extending from the uppermost surface of the tab portion to the lowermost surface of the tab portion, is less than or substantially equal to a thickness of the specimen platform portion measured in the same direction.

18. A cryostat chuck comprising:
a substantially circular specimen platform portion comprising:
a specimen mounting surface configured to have a specimen mounted thereat; and
an underside surface disposed opposite the specimen mounting surface;
wherein the specimen mounting surface is patterned with a plurality of ridges and trenches;
a stem portion extending from the underside surface of the specimen platform portion, wherein the stem portion is configured to be engaged by a cryostat; and
a tab portion formed as an elongate bar or rod which extends laterally from an arcuate edge of the specimen platform portion, wherein:

a longitudinal length of the tab portion is greater than a longitudinal length of the stem portion;

a maximum transverse width of the tab portion is less than a diameter of the specimen platform portion;

an uppermost surface of the tab portion is coplanar with an uppermost surface of the plurality of ridges such that there is a difference in elevation between the uppermost surface of the tab portion and the trenches;

a lowermost surface of the tab portion is coplanar with the underside surface of the specimen platform portion;

the tab portion adjoins the specimen mounting portion in only one quadrant of the specimen mounting portion; and the tab portion is configured to be gripped in a manner that permits manipulation of the cryostat chuck during engagement and disengagement of the stem portion by the cryostat.

\* \* \* \* \*